(12) United States Patent
Ho

(10) Patent No.: US 6,804,472 B1
(45) Date of Patent: Oct. 12, 2004

(54) TRANSMITTER AND METHOD USING HALF RATE DATA STREAMS FOR GENERATING FULL RATE MODULATION ON AN OPTICAL SIGNAL

(75) Inventor: Keangpo Ricky Ho, San Jose, CA (US)

(73) Assignee: StrataLight Communications, Inc., Campell, CA (US)

(*) Notice: Subject to any disclaimer, the term of this patent is extended or adjusted under 35 U.S.C. 154(b) by 19 days.

(21) Appl. No.: 10/299,425

(22) Filed: Nov. 18, 2002

(51) Int. Cl.[7] .................................................. H04B 10/04
(52) U.S. Cl. .................................... 398/193; 398/188
(58) Field of Search ................................ 398/183, 188, 398/189, 186, 193

(56) References Cited

U.S. PATENT DOCUMENTS

| | | | |
|---|---|---|---|
| 5,543,952 A | 8/1996 | Yonenaga et al. | 359/181 |
| 5,867,534 A | 2/1999 | Price et al. | 375/286 |
| 5,892,858 A | 4/1999 | Vaziri et al. | 385/2 |
| 5,917,638 A | 6/1999 | Franck et al. | 359/181 |
| 5,920,416 A | 7/1999 | Beylat et al. | 359/181 |
| 6,097,525 A | 8/2000 | Ono et al. | 359/181 |
| 6,188,497 B1 | 2/2001 | Franck et al. | 359/181 |
| 6,337,756 B1 | 1/2002 | Djupsjobacka | 359/181 |
| 6,388,786 B1 | 5/2002 | Ono et al. | 359/181 |
| 6,424,444 B1 | 7/2002 | Kahn et al. | 359/173 |
| 6,445,476 B1 | 9/2002 | Kahn et al. | 359/184 |
| 6,522,438 B1 * | 2/2003 | Mizuhara | 398/189 |
| 6,623,188 B1 * | 9/2003 | Dimmick et al. | 398/182 |

FOREIGN PATENT DOCUMENTS

| | | |
|---|---|---|
| EP | 1026863 A2 | 8/2000 |
| WO | WO 02/061978 A1 | 1/2002 |

OTHER PUBLICATIONS

Yoneyama, M., K. Yonenaga, Y. Kisaka, and Y. Miyamoto. "Differential Precoder IC Modules for 20–and 40–Gbit/s Optical Duobinary Transmission System," IEEE Transactions on Microwave Theory and Techniques, vol. 47, No. 12, Dec. 1999, pp. 2263–2270.*

P. B. Hansen and A. H. Gnauck, "A Dual–Drive Ti:LiNbO$_3$ Mach–Zehnder Modulator Used as an Optoelectronic logic gate for 10–Gb/s Simultaneous Multiplexing and Modulation," IEEE Photonics Technology Letters, vol. 4, No. 6, Jun. 1992, pp. 592–593.

X. Gu and L. C. Blank, "10 Gbit/s Unrepeatered Three–Level Optical Transmission Over 100 km of Standard Fibre," Electronics Letters, vol. 29, No. 25, Dec. 9, 1993, pp. 2209–2211.

A. J. Price and N. Le Mercier, "Reduced Bandwidth Optical Digital Intenstiy Modulation with Improved Chromatic Dispersion Tolerance," Electronics Letters, vol. 31, No. 1, Jan. 5, 1995, pp. 58–59.

K. Yonenaga, S. Kuwano, S. Norimatsu, and N. Shibata "Optical Duobinary Transmission System with no Receiver Sensitivity Degradation," Electronics Letters, vol. 31, No. 4, Feb. 16, 1995, pp. 302–304.

A. J. Price, L. Pierre, R. Yhel, and V. Havard "210 km Repeaterless 10 Gb/s Transmission Experiment through Nondispersion–Shifted Fiber USing Partial Response Scheme," IEEE Photonics Technology Letters, vol., 7, No. 10, Oct. 1995, pp. 1219–1221.

K. Yonenaga and S. Kuwano, "Dispersion–Tolerant Optical Transmission System Using Duobinary Transmitter and Binary Receiver," Journal of Lightwave Technology, vol. 15, No. 8, Aug. 1997, pp. 1530–1537.

(List continued on next page.)

*Primary Examiner*—Jason Chan
*Assistant Examiner*—Christina Y. Leung
(74) *Attorney, Agent, or Firm*—David R. Gildea

(57) ABSTRACT

An optical duobinary transmitter. The transmitter uses a half-rate precoder, half-rate non-linear modulation drive circuits and a multiplex modulator for generating duobinary modulation on an optical signal from which full-rate data can be detected without decoding.

12 Claims, 6 Drawing Sheets

OTHER PUBLICATIONS

T. Franck, P. B. Hansen, T. N. Nielsen, and L. Eskildsen "Duobinary Transmitter with Low Intersymbol Interference," IEEE Photonics Technology Letters, vol. 10, No. 4, 1998, pp. 597–599.

A. Djupsjobacka, "Prechirped Duobinary Modulation," IEEE Photonics Technology Letters, vol. 10, No. 8, Aug. 1998, pp. 1159–1161.

T. Ono et al., "Characteristics of Optical Duobinary Signals in Terabit/s Capacity, High–Spectral Efficiency WDM Systems," Journal of Lightwave Technology, vol. 16, No. 5, 1998, pp. 788–797.

K. Murata, K. Yonenaga, Y. Miyamoto, and Y. Yamane, "Parallel Precoder IC Module for 40–Gbit/s Optical Duobinary Transmission Systems," Electronics Letters, vol. 36, No. 18, Aug. 31, 2000, pp. 1571–1572.

Y. Fujisaku, K. Fujii, and Y. Ozeki, "A Novel Optical Duobinary Encoding Using OTDM Method," The $27^{th}$ European Conference on Optical Communication, Amsterdam, Netherland, 2001, pp. 142–143, paper Tu.L.1.6.

* cited by examiner

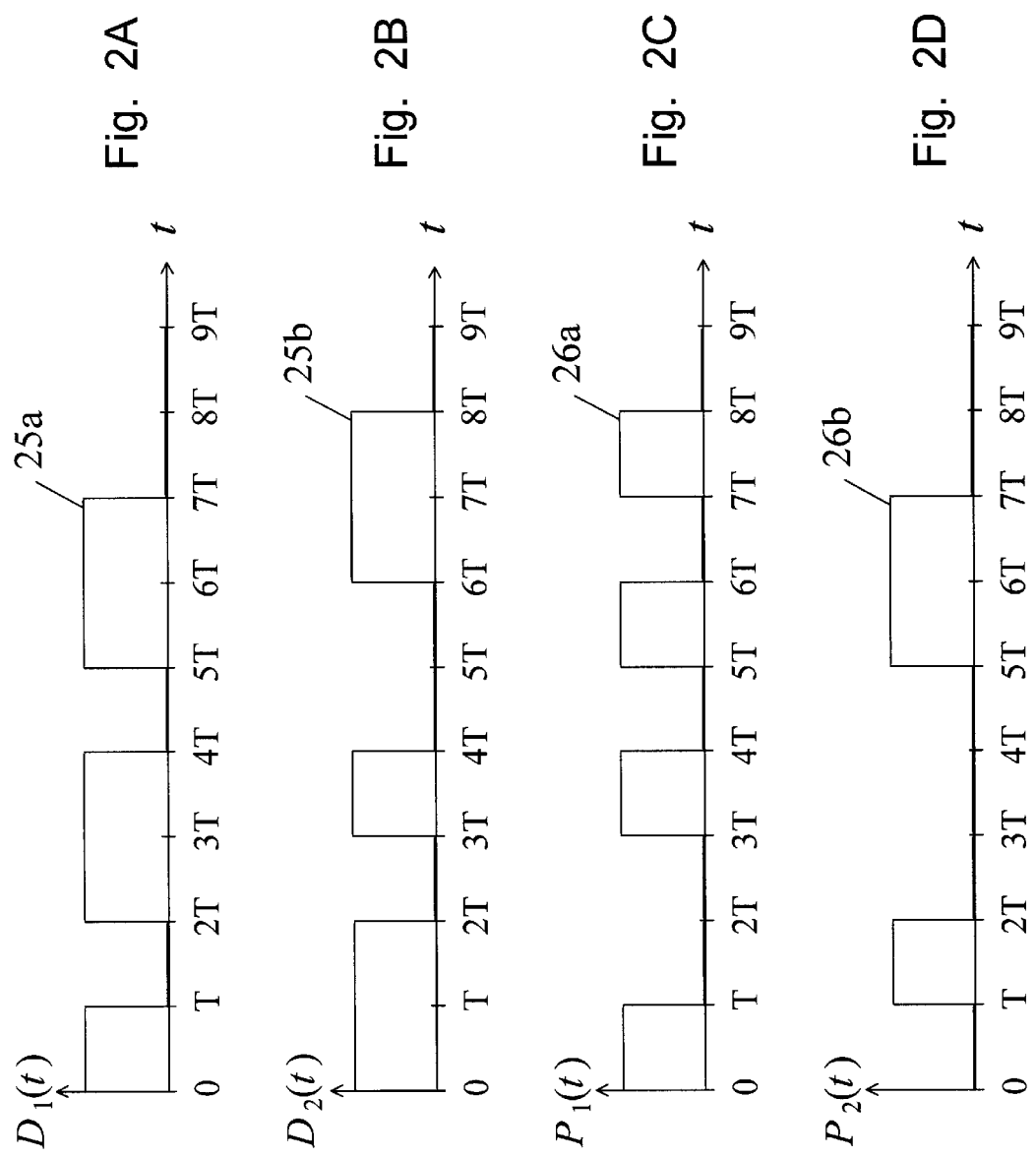

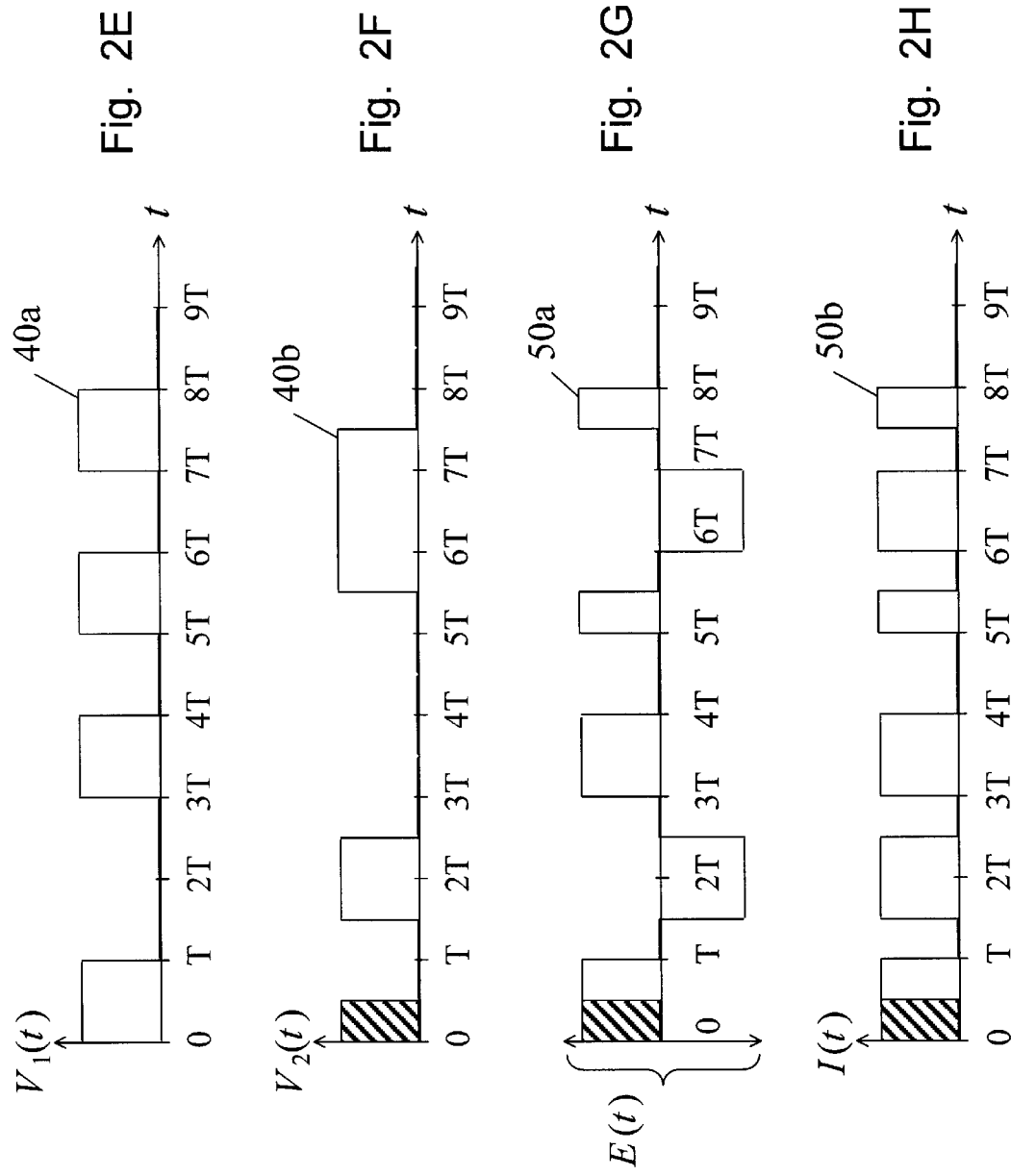

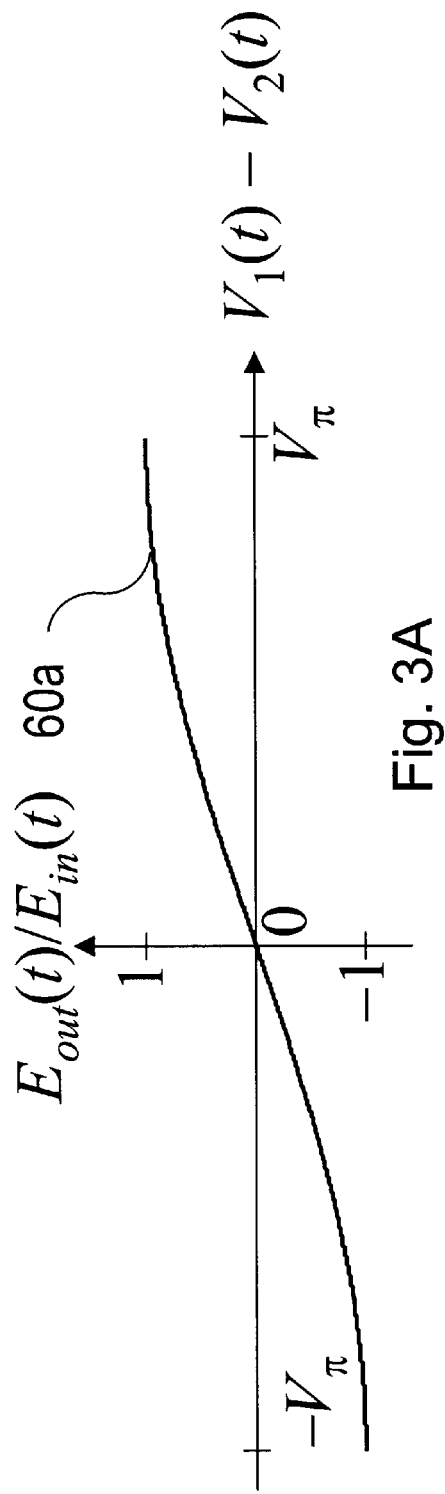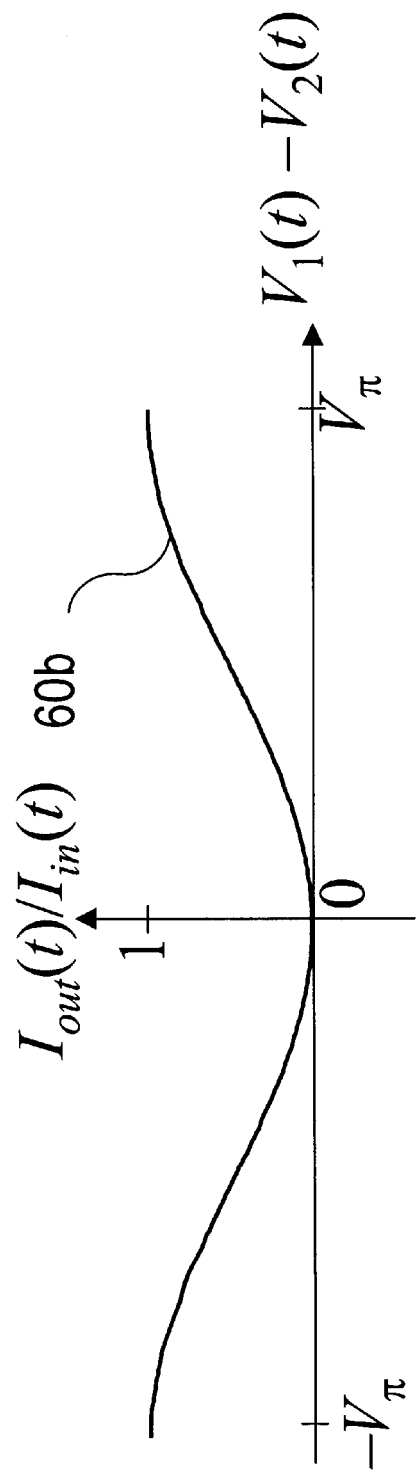

TRANSMITTER AND METHOD USING HALF RATE DATA STREAMS FOR GENERATING FULL RATE MODULATION ON AN OPTICAL SIGNAL

BACKGROUND OF THE INVENTION

1. Field of the Invention

The present invention is generally related to duobinary optical signal generation and more particularly to an optical transmitter and method using half rate data streams for generating full rate modulation in a duobinary optical signal.

2. Description of the Prior Art

Recently, optical duobinary techniques have attracted attention for narrowing the spectrum of a transmitted optical signal and reducing the waveform distortion that is induced by optical fiber chromatic dispersion. The spectrum of the transmitted signal is reduced by a factor of about two by mapping a binary data signal to be transmitted into a three-level duobinary signal, with redundancy within the three levels, to represent the binary data. While there are several techniques for implementing duobinary mapping onto an optical carrier, all of the techniques result in the transmission of equivalent optical signals that take on one of three possible optical electric-field amplitude values, with certain normalization, of $\{1, 0, 1\}$.

The transmitters for generating these optical signals have electronic circuits for generating signals for driving an optical modulator. One important limitation for these electronic circuits is data rate. In general, the higher the date rate, the more difficult it is to design the circuits and the more expensive they are to manufacture. A second limitation is linearity. In general, it is less difficult and less expensive, and higher data rates are possible, when the electronic circuits are not required to be linear.

The U.S. Pat. No. 5,867,534 by Price and Uhel; and papers "Reduced Bandwidth Optical Digital Intensity Modulation with Improved Chromatic Dispersion Tolerance" published in Electronics Letters, vol. 31, no. 1, in 1995 by A. J. Price and N. Le Mercier, and "210 km Repeaterless 10 Gb/s Transmission Experiment through Nondispersion-Shifted Fiber Using Partial Response Scheme" published in the IEEE Photonics Technology Letters in 1995 by A. J. Price, L. Pierre, R. Uhel and V. Havard report the usage of a low-pass filter to generate the three-level duobinary signal and an optical duobinary technique where a redundancy is given to optical phase. However, because the input of the low-pass filter is the full-rate non-return-to-zero (NRZ) data, full-speed electronic circuits are required.

The U.S. Pat. No. 5,543,952; and papers "Optical Duobinary Transmission System with no Receiver Sensitivity Degradation" published in Electronic Letters in 1995 by K. Yonenaga, S. Kuwano, S. Norimatsu and N. Shibata, and "Dispersion-Tolerant Optical Transmission System using Duobinary Transmitter and Binary Receiver" published in the Journal of Lightwave Technology in 1997 by K. Yonenaga and S. Kuwano report the usage of a delay-and-add circuit to generate the three-level duobinary signal and an optical duobinary technique where a redundancy is given to optical phase. Again, because the input of the delay-and-add circuit is the full-rate NRZ data, full-speed electronic circuits are required.

In both the U.S. Pat. Nos. of 5,543,952 and 5,867,534, electronic modulator drivers may operate at a bandwidth less than one-half the system data rate. However, the modulation drivers are required to be linear in order to handle the three levels of the duobinary signal.

The U.S. Pat. Nos. 5,917,638 and 6,188,497 by Franck et al, and a paper by T. Franck, P. B. Hansen, T. N. Nielsen, and L. Eskildsen entitled "Duobinary Transmitter with Low Intersymbol Interference" published in IEEE Photonics Technology Letters in 1998 report a duobinary transmitter having dual binary modulation signals for driving a modulator. In a simplified view, an optical modulator is used as an adder for the delay-and-add circuit used in the U.S. Pat. No. 5,543,952. However, full-rate circuits are again required as both modulation signals have the same data rate as the optical signal.

The U.S. Pat. No. of 6,337,756; and papers "A Dual-Drive Ti:LiNbO$_3$ Mach-Zehnder Modulator Used as an Optoelectronic logic gate for 10-Gb/s Simultaneous Multiplexing and Modulation" published in IEEE Photonics Technology Letters in 1992 of P. B. Hansen and A. H. Gnauck, and "Prechirped Duobinary Modulation" published in IEEE Photonics Technology Letters in 1998 by A. Djupsjobacka report the usage of a dual-drive modulator as both a multiplexer and a modulator. Each of the dual modulator drive signals operates at one half of the optical data rate. However, no method is proposed or successfully demonstrated for preceding the data for providing the modulator drive signals or for recovering the original data from the duobinary optical signal by symbol-by-symbol detection.

There is need for a duobinary optical transmitter using electronic circuits at low data rates without a requirement to be linear where the original data is recoverable with an optical receiver by symbol-by-symbol detection.

SUMMARY OF THE INVENTION

The present invention is a method and optical transmitter using electronic circuits operating at one-half data rate where the circuits operate without a requirement of linearity for generating an optical signal having full-rate duobinary modulation and where the original data is recoverable with an optical receiver by symbol-by-symbol detection.

Briefly, a preferred embodiment of an optical transmitter of the present invention includes a precoder and a multiplex modulator. The precoder uses two exclusive-OR gates and a one symbol delay component for calculating two cumulative cross parities for two input data streams. The multiplex modulator includes a one-half symbol delay component, modulation drivers and a dual-drive optical modulator. The one-half symbol delay component delays one of the cumulative cross parity streams by one-half symbol time with respect to the other. The modulation drivers amplify the cumulative cross parities either before or after the one-half symbol delay for driving the optical modulator. The optical modulator modulates an optical signal with a modulation drive signal corresponding to difference between the one-half symbol delayed cumulative cross parity stream-stream and the other cumulative cross parity stream for providing a duobinary optical signal having an optical electric field having an intensity that may be detected symbol-by-symbol for recovering the original data in the two input data streams.

An advantage of the present invention is that half-rate precoder and modulator driver circuits are used for generating full-rate duobinary modulation on an optical signal from which the original data can be simply detected without decoding. Because the modulator drive signals are binary, another advantage is that the modulation drivers can be operated as nonlinear amplifiers.

These and other objects and advantages of the present invention will no doubt become obvious to those of ordinary skill in the art after having read the following detailed description of the best mode which is illustrated in the various figures.

FIG. 1 is a block diagram showing a duobinary transmitter of the present invention using half-rate signal processing for providing a full-rate duobinary optical signal;

FIGS. 2A–B are time charts of first and second exemplary half-rate input data streams to the duobinary transmitter in FIG. 1;

FIGS. 2C–D are time charts of first and second cumulative cross parity streams in the duobinary transmitter of FIG. 1 for the input data streams of FIGS. 2A–B;

FIGS. 2E–F are time charts of first and second modulator drive signals in the duobinary transmitter of FIG. 1 for the input data streams of FIGS. 2A–B;

FIG. 2G is a time chart of a duobinary optical electric field provided by the duobinary transmitter of FIG. 1 for the input data streams of FIGS. 2A–B;

FIG. 2H is a time chart of an intensity of the duobinary optical electric field of FIG. 2G;

FIG. 3A is a transfer characteristic for the optical electric field of a dual-drive modulator of the duobinary transmitter of FIG. 1;

FIG. 3B is a transfer characteristic for the intensity of the optical electric field of a dual-drive modulator of the duobinary transmitter of FIG. 1;

DETAILED DESCRIPTION OF THE PREFERRED EMBODIMENTS

Figure 1:
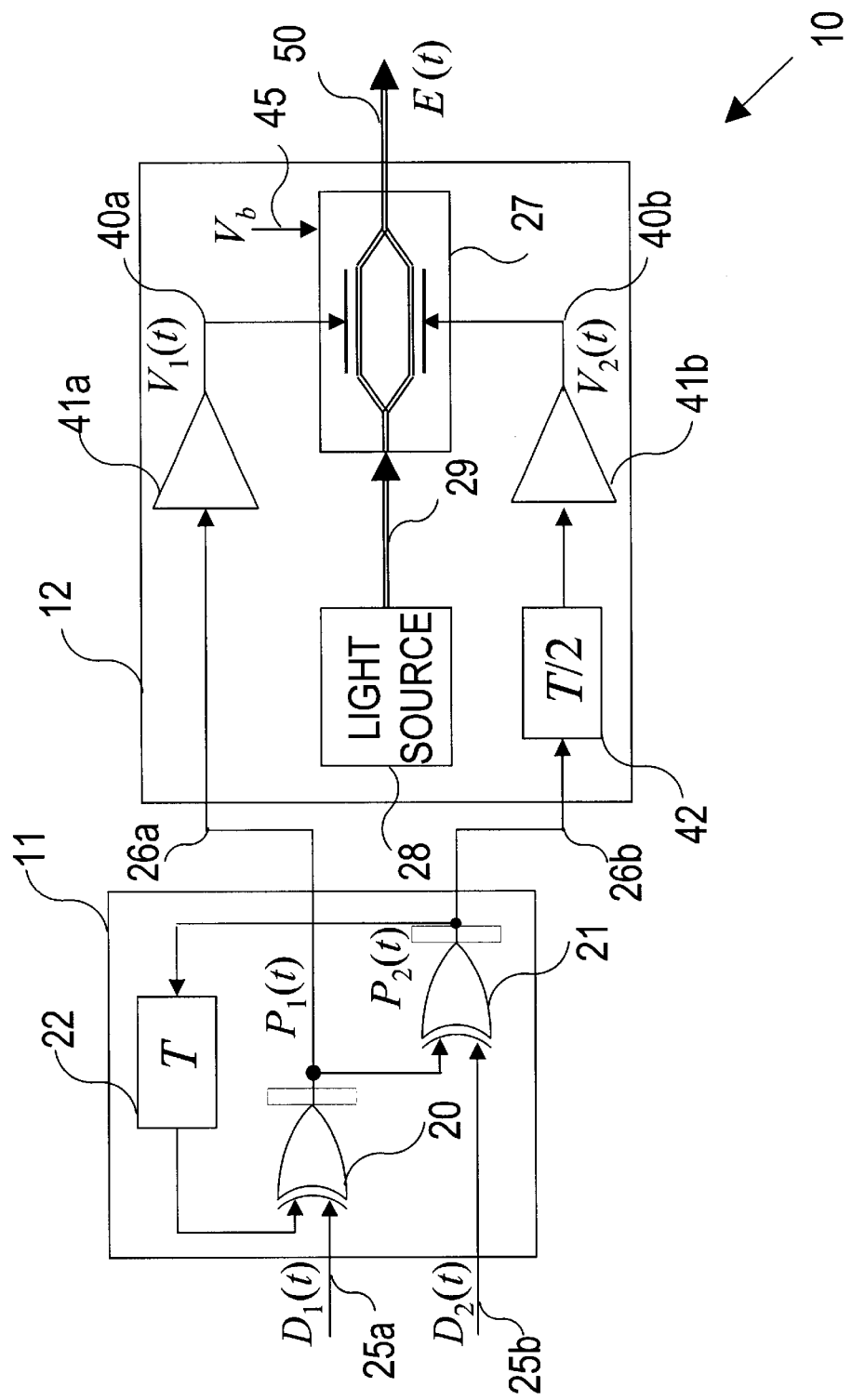

FIG. 1 shows a block diagram of a duobinary transmitter 10 of the present invention having a precoder 11 and a multiplex modulator 12. The precoder 11 uses first and second exclusive-OR gates 20 and 21, respectively, and a one-symbol delay component 22 for receiving first and second binary half-rate input data streams $D_1(t)$, denoted by 25a, and $D_2(t)$, denoted by 25b, respectively, and computing first and second cumulative cross parity streams $P_1(t)$, denoted by 26a, and $P_2(t)$, denoted by 26b, respectively. The first and second data streams $D_1(t)$ 25a and $D_2(t)$ 25b taken together carry the full-rate data that is to be transmitted.

The first exclusive-OR gate 20 provides the first cumulative cross parity stream 26a $P_1(t)$ equal to $P_2(t-T)+D_1(t)$ mod 2, and the second exclusive-OR gate 21 provides the second cumulative cross parity stream 26b $P_2(t)$ equal to $P_1(t)+D_2(t)$ mod 2, where the T is a half-rate input symbol time corresponding to the symbols in the half-rate input data-streams $D_1(t)$ 25a and $D_2(t)$ 25b. Recursive operation of the first exclusive-OR gate 20 results in the first cumulative cross parity stream 26a $P_1(t)$ of $D_1(t)+D_2(t-T)+D_1(t-T)+D_2(t-2T)+D_1(t-2T)+D_2(t-3T)+D_1(t-3T)+ \ldots$ modulo 2 as the cumulative cross parity of the first data stream $D_1(t)$ 25a and the second data stream 25b one symbol delayed $D_2(t-T)$. It should be noted that the first cumulative cross parity stream 26a $P_1(t)$ is the cross parity of the first data stream $D_1(t)$ 25a and the one symbol delayed second data stream $D_2(t-T)$ plus the previous first cumulative cross parity.

Similarly, recursive operation of the second exclusive-OR gate 21 results in the second cumulative cross parity stream 26b $P_2(t)$ of $D_2(t)+D_1(t)+D_2(t-T)+D_1(t-T)+D_2(t-2T)+D_1(t-2T)+D_2(t-3T)+D_1(t-3T)+ \ldots$ modulo 2 as the cumulative cross parity of the second data stream $D_2(t)$ 25b and the first data stream 25a. It should be noted that the second cumulative cross parity stream 26b $P_2(t)$ is the cross parity of the second data stream $D_2(t)$ 25b and the first data stream $D_1(t)$ plus the previous second cumulative cross parity. Filters may be inserted for filtering the cumulative cross parity streams $P_1(t)$ 26a and $P_2(t)$ 26b between the precoder 11 and the multiplex modulator 12.

The multiplex modulator 12 includes a dual-drive Mach-Zehnder optical modulator 27 and a light source 28. The light source 28 provides input light 29 to the optical modulator 27. The optical modulator 27 modulates the input light 29 with first and second modulator drive signals $V_1(t)$, denoted by 40a, and $V_2(t)$, denoted by 40b, respectively. A first modulator driver 41a amplifies the first precoder output (first cumulative cross parity stream) 26a for providing the first modulator drive signal 40a. A second modulator driver 41b amplifies the second precoder output (second cumulative cross parity stream) 26b before or after the second precoder output 26b is delayed by a one-half symbol delay component 42 by half the input symbol time (T/2). Because the modulator drive signals $V_1(t)$ 40a and $V_2(t)$ 40b are binary, the modulator drivers 41a and 41b may be limiting, saturated, or nonlinear amplifiers without a linearity requirement. The optical modulator 27 is biased with a bias voltage $V_b$, denoted by 45, for providing a modulator output signal 50. The bias voltage $V_b$ 45 is set so that the modulator output signal 50 is minimized when the voltages of the first and second modulator drive signals 40a and 40b are equal.

FIGS. 2A and 2B show exemplary first and second binary input data streams 25a $D_1(t)$ and 25b $D_2(t)$, respectively, versus time t. The time t is shown in units of the half-rate input symbol time T. FIGS. 2C and 2D show the first and second cumulative cross parities streams (first and second precoder output symbol streams) 26a $P_1(t)$ and 26b $P_2(t)$, respectively, responsive to the exemplary input data streams 25a and 25b, versus the time t. FIGS. 2E and 2F show the first and second modulator drive signals $V_1(t)$ 40a and $V_2(t)$ 40b, respectively, responsive to the exemplary input data streams 25a and 25b, versus the time t. The modulator drive signals 40a and 40b have a timing offset of T/2 (one-half the half-rate input symbol time), versus the time t. FIGS. 2G and 2H show the optical signal 50 (FIG. 1) in the form of an optical electric field E(t), denoted by 50a, and an optical intensity I(t), denoted by 50b, respectively, responsive to the exemplary input data streams 25a and 25b, versus the time t. Note that the beginning time t from 0 to T/2 of the signals 40b, 50a, and 50b cannot be derived from the input data streams 25a and 25b. Importantly, it should be noted that the optical intensity I(t) 50b corresponds to the multiplexed data in the combination of the first and second data input data streams $D_1(t)$ 25a and $D_2(t)$ 25b, thereby enabling symbol-by-symbol recovery by an intensity detector of the full-rate original data.

FIG. 3A shows an electric field transfer characteristic $E_{out}(t)/E_{in}(t)$, denoted by 60a, of the optical modulator 27 with respect to the difference $V_1(t)-V_2(t)$ between first and second modulator drive signals $V_1(t)$ 40a and $V_2(t)$ 40b. FIG. 3B shows an intensity transfer characteristic $I_{out}(t)/I_{in}(t)$, denoted by 60b, of the optical modulator 27 with respect to the difference $V_1(t)-V_2(t)$ between first and second modulator drive signals $V_1(t)$ 40a and $V_2(t)$ 40b. The peak-to-peak signal swing for each of the modulator drive signals 40a and 40b is equal to the maximum peak input $V_\pi$ specified for the modulator 27.

Using the transfer characteristic 60a in FIG. 3A in terms of an optical electrical field, the modulator output signal 50 has the optical electrical field of 50a that is shown in FIG. 2G. The optical electrical field of 50a is a duobinary signal with the following properties: a) the signal has the same sign if there are even number of zeros in between; b) the signal changes sign if there are odd number of zeros in between; c) there is no direct transition from positive to negative electrical field and vice versus without first through the zero state.

Using the transfer characteristic 60b in FIG. 3B in term of intensity, the modulator output signal 50 has the intensity of 50b that is shown in FIG. 2H. Comparing the waveform of the output intensity 50b with the input data streams 25a and 25b, it is seen that the intensity 50b is a multiplexed signal of both 25a and 25b. If a photodetector is used to detect the intensity of 50b, no decoder but a demultiplexer is required to recover the original data in the waveforms of 25a and 25b. Importantly, the intensity waveform of 50b has twice the data-rate of the input data streams of 25a and 25b.

Figure 4:
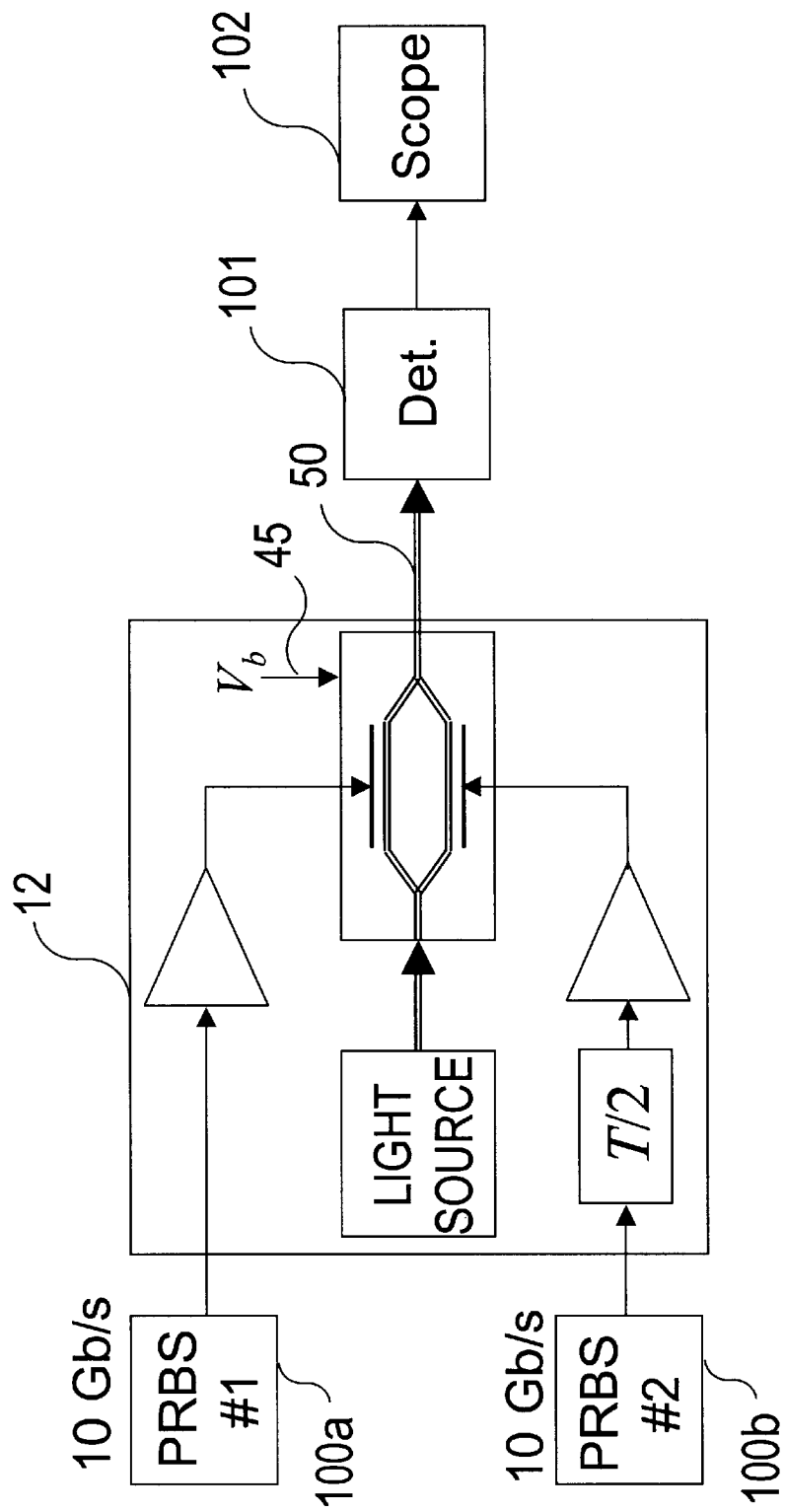
FIG. 4 illustrates an experimental setup for verifying the multiplexing and modulating functions of the duobinary transmitter of FIG. 1.

FIG. 4 illustrates an experimental setup for demonstrating the function of the multiplexing modulator 12 using two 10 Gb/s pattern generators 100a and 100b to give two independent $2^{31}-1$ pseudo-random-bit-sequences (PRBS). The output 50 of the multiplexing modulator 12 is passed to a photodetector 101 followed by an oscilloscope 102.

Figure 5:
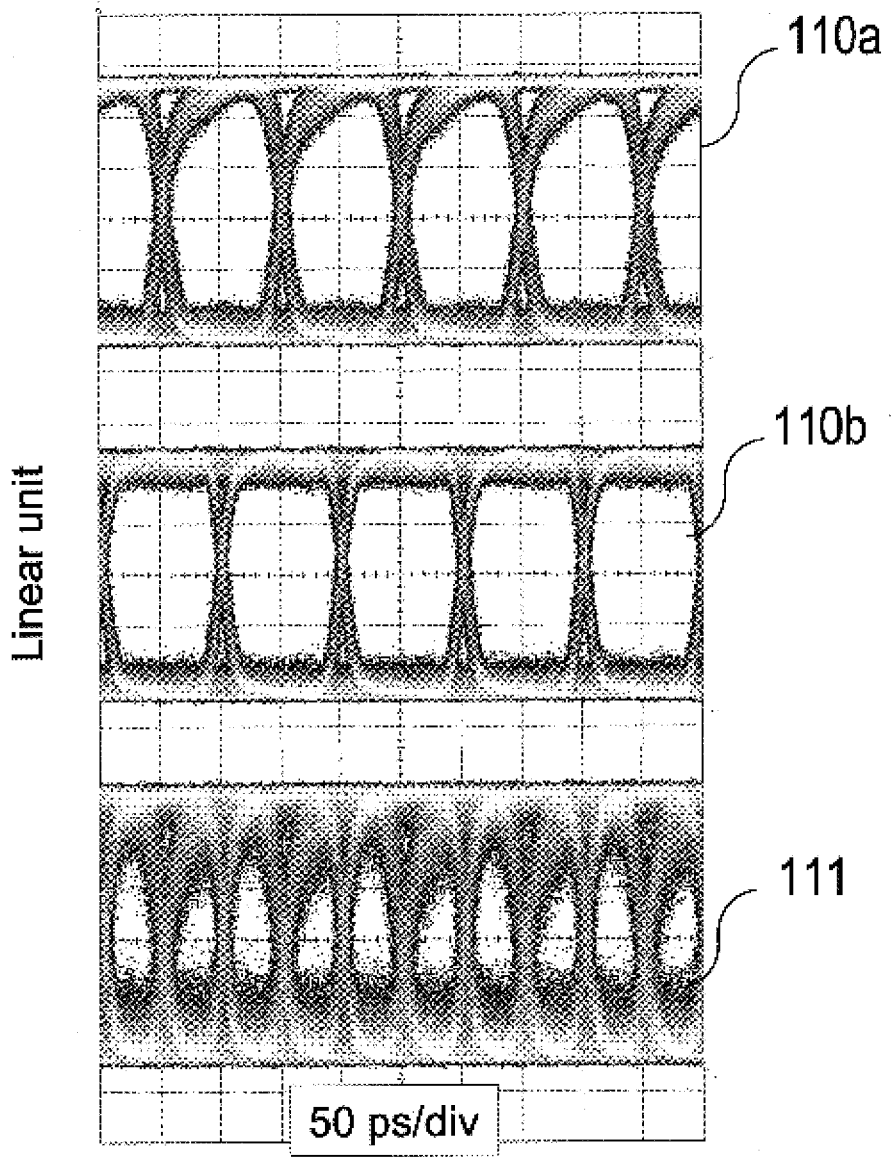
FIG. 5 illustrates measured waveforms for the experimental setup of FIG. 4.

FIG. 5 shows measured eye-patterns 110a, 110b and 111, respectively, at the oscilloscope 102, when the bias voltage $V_b$ 45 (FIG. 1) is properly adjusted for each individual case. The eye-pattern 110a is recorded when the pattern generator 100a is operating and the pattern generator 100b is not operating. The eye-pattern 110b is recorded when the pattern generator 100b is operating and the pattern generator 100a is not operating. The eye-pattern 111 is recorded when both the pattern generator 100a and 100b are operating. Comparing eye-patterns 110a, 110b and 111 confirms the operation of the multiplex modulator 12.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

What is claimed is:

1. An optical transmitter, comprising:
   a precoder for precoding two half-rate data streams having half-rate input symbol times into two cumulative cross parity streams, said half-rate data streams carrying data equivalent to a single full-rate data stream;
   a multiplex modulator for using said parity streams for providing an optical signal carrying duobinary modulation having intensity corresponding to said full-rate data stream; wherein:
   a current parity of a first of said parity streams is a cross parity of a current symbol of a first of said half-rate data streams with a delayed second half-rate data stream, plus a last previous parity of said first parity stream, where a second of said half-rate data streams is delayed by said input symbol time for providing said delayed second half-rate data stream; and
   a current parity of a second of said parity streams is a cross parity of a current symbol of said second half-rate data stream with a current symbol of said first half-rate data stream, plus a last previous parity of said second parity stream.

2. The transmitter of claim 1, wherein:
   said duobinary modulation corresponds to a difference between a half-delayed second parity stream and said first parity stream where said second parity stream is delayed by one-half said input symbol time with respect to said first parity stream for providing said half-delayed second parity stream.

3. An optical transmitter, comprising:
   a precoder for precoding two half-rate data streams having half-rate input symbol times into two cumulative cross parity streams, said half-rate data streams carrying data equivalent to a single full-rate data stream:
   a multiplex modulator for using said parity streams for providing an optical signal carrying duobinary modulation having intensity corresponding to said full-rate data stream; wherein:
   the precoder includes a symbol delay component for delaying a second of said parity streams by said input symbol time for providing a delayed parity stream; a first gate for exclusive-OR combining a first of said half-rate data streams and said delayed parity stream for providing a first of said parity streams; and a second gate for exclusive-OR combining a second of said half-rate data streams with said first parity stream for providing said second parity stream.

4. The transmitter of claim 3, wherein:
   the multiplex modulator includes a one-half symbol delay component for delaying said second parity stream by one-half said input symbol time with respect to said first parity stream for providing a half-delayed second parity stream, and an optical modulator for modulating an optical carrier with a modulation drive corresponding to a difference between said half-delayed second parity stream and said first parity stream for providing said duobinary modulation as an optical electric field having said intensity.

5. The transmitter of claim 4, wherein:
   the multiplex modulator includes a dual-drive optical modulator for multiplexing said half-delayed second parity stream and said first parity stream onto said optical signal for forming said optical electric field.

6. An optical transmitter, comprising:
   a precoder for precoding two half-rate data streams having half-rate input symbol times into two cumulative cross parity streams, said half-rate data streams carrying data equivalent to a single full-rate data stream;
   a multiplex modulator for using said parity streams for providing an optical signal carrying duobinary modulation having intensity corresponding to said full-rate data stream, wherein:
   said optical signal has an optical electric field having low field states and non-zero field states, said intensity greater in said non-zero field states than in said low field states; and
   said optical electric field has one of said non-zero field states having a first field sense when there are an even number of said low field states following a last one of said non-zero field states; has a change in said field sense when there are an odd number of said low field states following said last non-zero field state; and has no change in said field sense until at least one of said low field states after said last non-zero field state.

7. A method for transmitting an optical signal, comprising:

precoding two half-rate data streams having half-rate input symbol times into two cumulative cross parity streams, said half-rate data streams carrying data equivalent to a single full-rate data stream;

multiplexing representations of said parity streams onto an optical signal as duobinary modulation having intensity corresponding to said full-rate data stream; wherein:

a current parity of a first of said parity streams is a cross parity of a current symbol of a first of said half-rate data streams with a delayed second half-rate data stream, plus a last previous parity of said first parity stream, where a second of said half-rate data streams is delayed by said input symbol time for providing said delayed second half-rate data stream; and a current parity of a second of said parity streams is a cross parity of a current symbol of said second half-rate data stream with a current symbol of said first half-rate data stream, plus a last previous parity of said second parity stream.

8. The method of claim 7, wherein:

said duobinary modulation corresponds to a difference between a half-delayed second parity stream and said first parity stream where said second parity stream is delayed by one-half said input symbol time with respect to said first parity stream for providing said half-delayed second parity stream.

9. A method for transmitting an optical signal, comprising:

precoding two half-rate data streams having half-rate input symbol times into two cumulative cross parity streams, said half-rate data streams carrying data equivalent to a single full-rate data stream;

multiplexing representations of said parity streams onto an optical signal as duobinary modulation having intensity corresponding to said full-rate data stream; wherein:

the step of precoding includes delaying a second of said parity streams by said input symbol time for providing a delayed parity stream; exclusive-OR combining a first of said half-rate data streams and said delayed parity stream for providing a first of said parity streams; and exclusive-OR combining a second of said half-rate data streams with said first parity stream for providing said second parity stream.

10. The method of claim 9, wherein:

the step of multiplexing includes delaying said second parity stream by one-half said input symbol time with respect to said first parity stream for providing a half-delayed second parity stream; and modulating an optical carrier with a modulation drive corresponding to a difference between said half-delayed second parity stream and said first parity stream for providing said duobinary modulation as an optical electric field having said intensity.

11. The method of claim 10, wherein:

the step of multiplexing includes using a dual-drive optical modulator for multiplexing said half-delayed second parity stream and said first parity stream onto said optical signal for forming said optical electric field.

12. A method for transmitting an optical signal, comprising:

precoding two half-rate data streams having half-rate input symbol times into two cumulative cross parity streams, said half-rate data streams carrying data equivalent to a single full-rate data stream;

multiplexing representations of said parity streams onto an optical signal as duobinary modulation having intensity corresponding to said full-rate data stream; wherein:

said optical signal has an optical electric field having low field states and non-zero field states, said intensity of said non-zero field states greater than said low field states; and the step of multiplexing includes modulating said optical signal for said optical electric field having one of said non-zero field states having a first field sense when there are an even number of said low field states following a last one of said non-zero field states; having a change in said field sense when there are an odd number of said low field states following said last non-zero field state; and having no change in said field sense until at least one of said low field states after said last non-zero field state.

\* \* \* \* \*